Sept. 6, 1966   T. L. VEIT ETAL   3,271,308
PACKING MATERIAL AND METHOD AND APPARATUS
UTILIZING SAID PACKING MATERIAL
Filed May 17, 1960
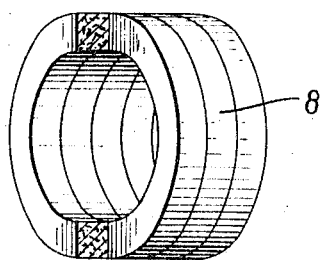
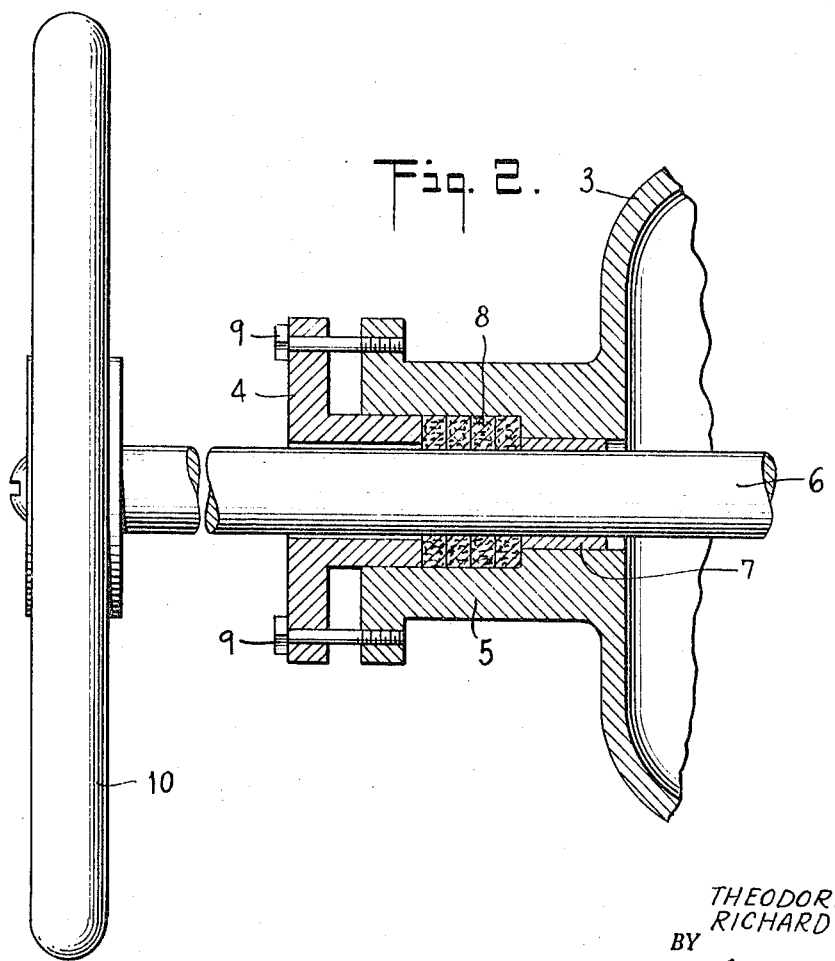
INVENTORS
THEODORE L. VEIT
RICHARD W. WATSON
BY
*Robert Henderson*
ATTORNEY

United States Patent Office 3,271,308
Patented Sept. 6, 1966

3,271,308
PACKING MATERIAL AND METHOD AND APPARATUS UTILIZING SAID PACKING MATERIAL
Theodore L. Veit and Richard W. Watson, Palmyra, N.Y., assignors to Garlock Inc., Palmyra, N.Y., a corporation of New York
Filed May 17, 1960, Ser. No. 29,682
6 Claims. (Cl. 252—13)

This invention relates to packing as is used to provide a seal between adjacent parts of machinery, for example, between a valve bonnet and a valve stem or a shaft and a casing through which the shaft extends.

Frequently, packing material is formed of a base or body forming component, which is usually mineral fiber, a solid lubricant, and a binder for the composition. The mineral fiber can be a natural fiber such as asbestos or a synthetic mineral fiber such as fiberglass, or aluminum silicate. The solid lubricant can be graphite or mica. For the binder, rubber-like or elastomer materials have come to be recognized as the best suited for the service. A typical composition for packing material is an admixture of asbestos fiber and graphite, and, as a binder for the admixture, a nitrile or Buna N elastomer.

While packing material of composition as described is satisfactory for many operating conditions, it has certain shortcomings for use under other conditions, and this, of course, detracts from its general suitability for service as packing. Thus, packing of composition as described is not well suited for use in a location where the temperature is in the range of about 400–500 F. The difficulty is with respect to the binder. At temperatures of about 400–500° F., the binder undergoes a change, probably involving oxidation, and embrittlement of the packing results. The embrittlement is undesirable since the effectiveness of packing material to provide a seal is dependent upon the packing being sufficiently pliable so that it can conform closely to surfaces which it engages.

In the usual application of packing material, pressure is maintained on the packing to cause the packing to deform or flow as is necessary in order that it will continuously conform to the surfaces with respect to which it is to form a seal. Where the packing is contained, for example, in a stuffing box, pressure is maintained on it by the bonnet or gland, and where the packing is used as a gasket, pressure is maintained on it by bolting securing the gasketed parts together. Embrittled packing is not sufficiently pliable to respond to the applied pressure and so its effectiveness to provide a seal is impaired. Further, in the course of service, due to wear or aging of the packing, applied pressure becomes dissipated and, to compensate for this, the gland, in the case of stuffing boxes, or bolting, in the case of gaskets, is periodically adjusted to compress the packing and restore the applied pressure to a suitable value. The embrittlement precludes the making of such adjustments.

Another undesirable consequence of the above-described change in known packing and which occurs at temperatures of about 400–500° F. is that the embrittled packing adheres to adjoining parts of the machinery. This makes removal of the packing inconvenient. Commonly, embrittlement and adherence of the packing are such that a chisel has to be used to remove the packing.

A principal object of the invention is to provide packing generally suited for packing service and regardless of the temperature. More particularly, it is a purpose of the invention to provide packing which does not undergo embrittlement or adhere strongly to adjoining parts at operating temperatures but, rather, retains its compressibility throughout the range of operating temperatures, so that it is sufficiently deformable, regardless of operating temperature, to provide a suitable seal.

According to the invention, these and other objects are attained by utilizing a novel packing material comprising an admixture of a base component, such as mineral fiber of the type described hereinbefore, and a solid lubricant, such as the solid lubricants graphite or mica, and containing, as a binder for the admixture, a volatile material which, upon expulsion from the packing material due to heating, leaves the packing in compressible condition and otherwise suited for service as packing. It has been found that butyl rubber, polyisobutylene and polybutene fulfill the requirements for the binder.

In operation, the binder can remain as such in the packing material, and this will be the case where the operating temperature is below the temperature at which volatilization of the binder occurs. The binder, however, can be absent from the packing, having been expelled therefrom due to the operating temperature being above the volatilization temperature of the binder. Thus, the packing material is suited for use at either high or low temperatures.

As well as providing a novel packing material composition, where the packing is used in the form comprising an admixture of mineral fiber and a solid lubricant from which the binder has been expelled, the invention provides a novel method of installing the packing. Thus, according to the invention, packing is provided between spaced machine parts to interconnect the parts in sealed relation by filling the space with the packing composition including the binder, and thereafter heating the packing material to expel the binder therefrom and leave the mineral fiber-solid lubricant admixture deposited in place to provide the desired seal. The heating for expulsion of the binder can be, and preferably is, provided merely by operation of the device with which the packing is used and allowing the heat incidental to operation of the device to expel the binder.

Additionally, where the packing is in the form of the mineral fiber-solid lubricant admixture from which the binder has been expelled, the combination of the sealed machine parts and the packing is novel. Thus, the invention provides the combination of a compressible packing and spaced machine parts interconnected by the packing in sealed relation, the packing comprising an admixture of mineral fiber and a solid lubricant, which admixture is the residue derived by expelling with heat the volatile binder of the packing material comprising the mineral fiber, solid lubricant and binder.

The binders suitable for the purposes of the invention are those which are volatile as such and, hence, are expelled from the packing material on suitable heating, or those which are volatile by reason of change occurring, such as depolymerization of other chemical change, which provides the binder in a form so that expulsion occurs upon suitable heating. The change can be a decomposition of the binder to volatile materials. The invention does not, however, contemplate decomposition of the binder which permanently deposits in the packing decomposition products such as, for example, coke, or otherwise leaves a residue in the packing.

As set forth above, binder materials found to be particularly well suited for the invention are butyl rubber, polyisobutylene, and polybutene. Vistanex brand polyisobutylene of Enjay Co., Inc., and Indopol brand polybutene of Amoco Chemicals Corp., have been found to be well suited for the purpose of the invention. The normally solid, high molecular weight elastomer material is preferred. This is the form having rubber-like properties. Similarly, with respect to the butyl rubber or diolefin-isobutylene copolymer, the high molecular weight elastomer material, which has rubber-like properties, is preferred. The butyl rubber can contain as the diolefin either isoprene or butadiene. The polyisobutylene, polybutene, and butyl rubber have suitable elasticity and tackiness and other properties so that they are suitable binders and, additionally, they are suitably volatile to fulfill the requirements according to the invention. Upon expulsion due to volatilization, they leave the packing in compressible condition satisfactory to packing service and, in addition, in a condition such that the packing is easy to remove.

The amount of binder can be a small amount effective to provide suitable binding action, up to about 30% or even more of the packing material composition, i.e. the mineral fiber, solid lubricant and binder. The optimum amount for a given application will depend upon the particular conditions and can be readily determined by experiment. Usually, the amount will be in the range of from about 1–30%, preferably about 5–25%. Since the binder may be expelled from the composition during use, care should be taken that the amount expelled is not so great as to result in an inordinately large evolution of binder as would interfere with utilization of the packing.

The amount of mineral fiber and of solid lubricant can be amounts as are commonly used in packing compositions.

Suitable formulations for the packing composition are the following:

*Formulation I*

| | Percent |
|---|---|
| Butyl rubber or polyisobutylene | 5–25 |
| Powdered graphite | 45–60 |
| Asbestos fiber | 25–35 |

*Formulation II*

| | Percent |
|---|---|
| Polybutene | .10–25 |
| Powdered graphite | 45–60 |
| Asbestos fiber | 25–35 |

Various modifications in the composition can be made. Thus, mica can be included as the solid lubricant, the mineral fiber can be fiberglass or aluminum silicate, and finely divided or shredded metal can be included in the composition.

The invention is further described in reference to the accompanying drawing, in which:

FIGURE 1 is a view of a shaped mass of packing material according to the invention; and FIG. 2 is a view, in cross-section, of a portion of a valve provided with packing according to the invention.

The packing composition of the invention can be used as a bulk material without any particular shape, in which case it can be applied by, for example, troweling, or it can be provided as a shaped mass, for example, such as is shown in FIG. 1. The shaped mass shown in FIG. 1 is plural ring packing suitable for use in a stuffing box. The packing composition comprises mineral fiber, solid lubricant and binder according to the invention.

If desired, the shaped packing material of the invention can be provided with a skeleton jacket in the form of a light braid and which serves to hold the mass together during handling. Alternatively, it can be provided with a full jacket which holds the material tightly together and is a permanent part of the packing and serves a packing function.

In FIG. 2, there is represented packing according to the invention in place between spaced parts of a valve, namely, between the valve bonnet 3 and valve stem 6. A stuffing box 5 is formed as an integral part of the valve bonnet 3, and the stem 6 extends through the stuffing box 5 and is journaled in sliding bearing 7. Packing 8 is contained in the stuffing box, and gland 4 is urged axially by bolts 9 so as to compress the packing into sealing engagement with the valve stem 6. The packing 8 is of the form represented in FIG. 1 and can be the admixture of mineral fiber and solid lubricant as the residue remaining following expulsion of binder from the packing composition. A handwheel 10 is mounted on the stem 6.

Packing composition and shaped articles according to the invention can be formed by procedures known in the art for the production of packing. Thus, the packing composition can be formed by blending of the ingredients, and the shaped articles can be formed by molding and extruding.

Percentages set forth in the specification and the appended claims are percent by weight.

The invention has been described in detail with reference to particular embodiments of the invention, and it is to be expected that various modifications and alternatives will occur to those skilled in the art. It is intended to include within the invention all such variations as are within the scope of the appended claims.

What is claimed is:

1. A packing material consisting essentially of mineral fiber in an amount sufficient to impart body to the packing material, and solid lubricant in an amount sufficient to provide for lubrication in use, and butyl rubber as binder for the mineral fiber and solid lubricant, said binder being present in amount of from about 1% to about 30% of the packing material, and being volatile and upon volatilization leaving the mineral fiber and solid lubricant in compressible condition.

2. A packing material consisting essentially of mineral fiber in an amount sufficient to impart body to the packing material, and solid lubricant in an amount sufficient to provide for lubrication in use, and polyisobutylene as binder for the mineral fiber and solid lubricant, said binder being present in amount of from about 1% to about 30% of the packing material, and being volatile and upon volatilization leaving the mineral fiber and solid lubricant in compressible condition.

3. A packing material consisting essentially of mineral fiber in an amount sufficient to impart body to the packing material, and solid lubricant in an amount sufficient to provide for lubrication in use, and polybutene as binder for the mineral fiber and solid lubricant, said binder being present in amount of from about 1% to about 30% of the packing material, and being volatile and upon volatilization leaving the mineral fiber and solid lubricant in compressible condition.

4. A packing material consisting essentially of a mineral fiber in an amount sufficient to impart body to the packing material, solid lubricant in an amount sufficient to provide for lubrication in use, and binder for the mineral fiber and solid lubricant in an effective amount, said binder being a material selected from the group consisting of butyl rubber, polyisobutylene, and polybutene, and being volatile and upon volatilization leaving the mineral fiber and solid lubricant in compressible condition.

5. A packing material consisting essentially of mineral fiber in an amount sufficient to impart body to the packing material, solid lubricant in an amount sufficient to provide for lubrication in use, and a binder for the mineral fiber and solid lubricant, said binder being a material selected from the group consisting of butyl rubber, polyisobutylene, and polybutene, said binder being present in amount of from about 1% to about 30% of the packing material, and being volatile and upon volatilization leaving the mineral fiber and solid lubricant in compressible condition.

6. A packing material for forming a seal between spaced machine parts, consisting essentially of mineral fiber in an amount sufficient to impart body to the packing material, and solid lubricant in an amount sufficient to provide for lubrication in use, and a binder for the mineral fiber and solid lubricant, said binder being present in amount of from about 1% to about 30% of the packing material, and being volatile so that at the volatilization temperature of the binder, the latter is expelled from the packing material, leaving the mineral fiber and solid lubricant in compressible condition to enable it to be forced by pressure into sealing engagement with said spaced machine parts.

References Cited by the Examiner
UNITED STATES PATENTS

| | | | |
|---|---|---|---|
| 1,379,155 | 5/1921 | Acheson | 252—12.6 X |
| 1,585,087 | 5/1926 | Deems | 286—28 X |
| 2,235,438 | 3/1941 | Leistensnider | 252—12.6 |
| 2,312,579 | 3/1943 | O'Brien | 18—59 |
| 2,356,367 | 8/1944 | Wright | 252—9 |
| 2,448,483 | 8/1948 | Bassett | 18—59 |
| 2,504,936 | 4/1950 | Payne | 18—59 |
| 2,672,443 | 3/1954 | Screnock | 252—12.6 |
| 2,776,154 | 1/1957 | Leistensnider | 277—203 |

DANIEL E. WYMAN, *Primary Examiner.*

C. D. ANGEL, M. M. FRITZ, *Examiners.*

P. B. LANHAM, M. MEHR, I. VAUGHN,
*Assistant Examiners.*

UNITED STATES PATENT OFFICE
CERTIFICATE OF CORRECTION

Patent No. 3,271,308                                September 6, 1966

Theodore L. Veit et al.

It is hereby certified that error appears in the above numbered patent requiring correction and that the said Letters Patent should read as corrected below.

Column 3, line 34, for ".10-25" read -- 10-25 --.

Signed and sealed this 1st day of August 1967.

(SEAL)
Attest:

EDWARD M. FLETCHER, JR.                      EDWARD J. BRENNER
Attesting Officer                                  Commissioner of Patents